United States Patent Office.

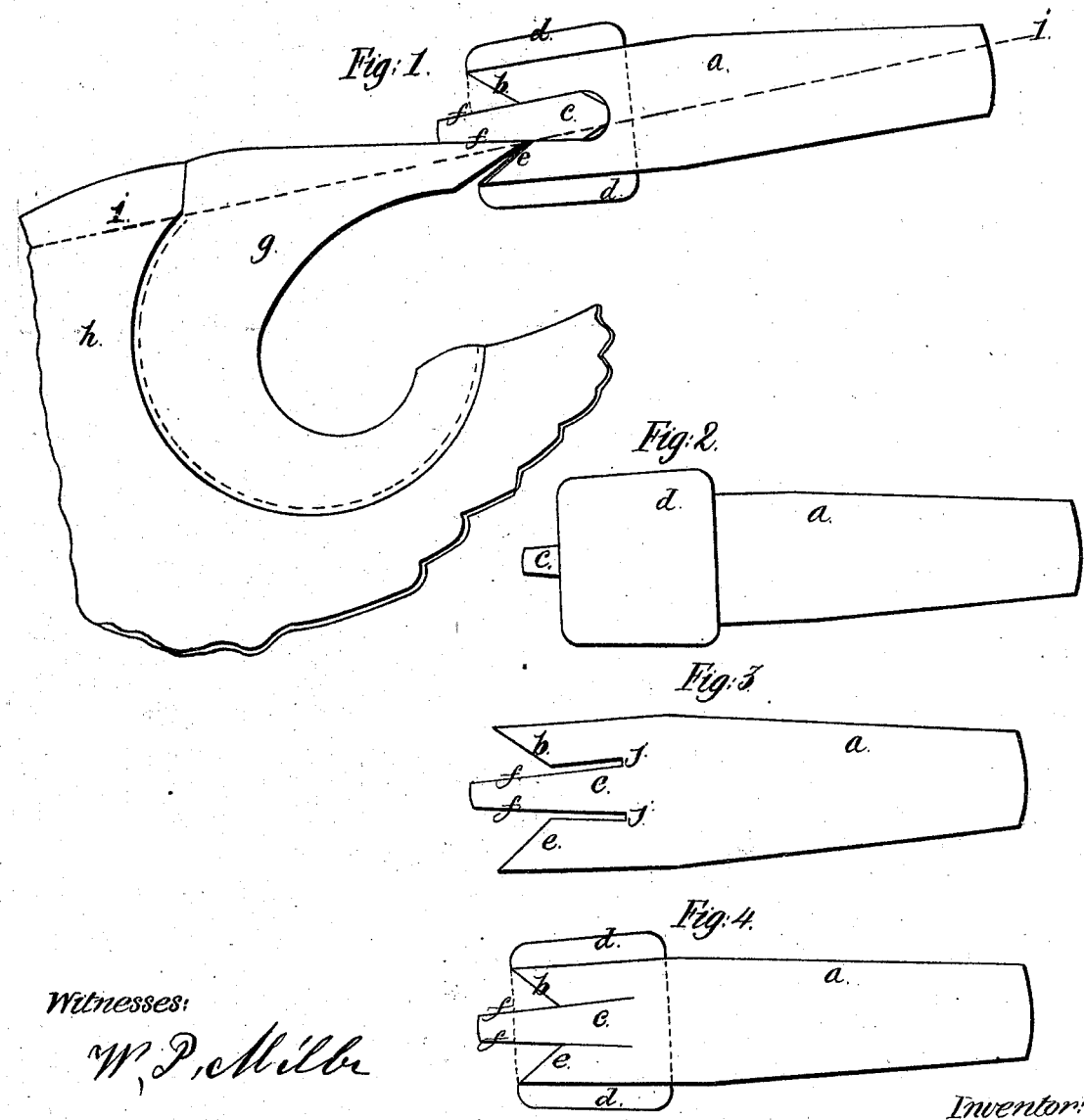

JOSEPH S. CLARK, OF NEW YORK, N. Y.

Letters Patent No. 97,763, dated December 14, 1869.

IMPROVEMENT IN SAW-SWAGE.

The Schedule referred to in these Letters Patent and making part of the same.

*To all whom it may concern:*

Be it known that I, JOSEPH S. CLARK, of the city and State of New York, have invented a new and improved Mode of Constructing Swages for Spreading and Sharpening Saw-Teeth; and I do hereby declare that the following is a full, clear, and exact description of the construction and operation of the same, reference being had to the annexed drawings, making a part of this specification, in which—

Figure 1 is a side sectional view of a swage placed upon a saw-tooth, and standing at the proper angle to receive the force of a hammer, and thereby spread the edge of the tooth.

Figure 2, a side view of a swage complete.

Figure 3, a side sectional view, showing how the tongue $c$ may be formed, by sawing two cuts at an angle with the stock $a$.

Figure 4, a view of the same after the jaws $b$ and $e$ have been forged down on to the tongue.

Like letters refer to like parts on the several drawings.

Letter $a$, the stock or shank of the swage.
Letters $d\,d$, the collar.
Letter $c$, the tongue.
Letter $b$, the straight jaw.
Letter $e$, the convex jaw.
Letters $f\,f$, the two planes of the tongue.
Letter $g$, saw-tooth.
Letter $h$, part of the saw-plate.
Letters $i\,i$, dotted line, showing the direction of the blow of the hammer.
Letters $j\,j$, the cuts on each side of the tongue.

To construct a swage, I first forge a piece of cast-steel for the stock $a$ into the size and form shown on the drawings, mill out a central cavity for the tongue $c$, the line of the two sides being at an angle with that of the centre of the stock; then finish the ends of the two jaws $b$ and $e$ on a bevel, making $b$ straight, and $e$ a little round or convex on the face. The tongue is next formed, as shown at $c$, fig. 1, and fitted accurately into the jaws $b$ and $e$.

The collar $d$ is made of iron, perfectly fitted to the jaws, and driven on tight after the ends of the jaws and the tongue have been hardened and tempered.

On examination of fig. 1, it will be observed that the shank $a$ is elevated at an obtuse angle to the line of the top of the tooth. This elevated position is necessary in order that the force of the blow, when applied to the end of the shank, will be in the direction of the best supported portion of the tooth.

If the line of the shank were placed parallel with that of the top of the tooth, the end of the tooth would jump up at each blow of the hammer.

The position of the swage as described is common to all swages in use. This position is unavoidable; hence, it will be observed, that in order to have the angles of the two jaws $b\,e$ intersect the planes $f\,f$, the tongue $c$ should be made in form as shown, instead of the lines $f\,f$ being made parallel with that of the shank.

The object in making the tongue $c$ separate from the shank is for the purpose that it may be taken out, and thus admit the jaws $b$ and $e$ to be ground and repaired when necessary.

I am aware that a removable die has been used in a saw-set, as seen in the patent of N. F. Stone, dated April 17, 1866; I do not, therefore, claim broadly a removable die in a saw-swage.

My invention differs materially from that of Stone's, referred to. In my invention, the die $c$ is not only replaceable when broken, but can be removed, for the purpose of grinding the jaws $b$ and $e$ when inoperative.

What I claim as my invention, and desire to secure by Letters Patent, is—

The removable die $c$, in combination with the bevelled jaws $b$ and $e$, and handle $a$, all constructed, arranged, and operated as set forth.

JOSEPH S. CLARK.

Witnesses:
W. D. MILLER,
WM. L. GARDNER.